June 4, 1940.　　C. G. STRANDLUND　　2,202,931
DISK PLOW
Filed June 23, 1939　　6 Sheets-Sheet 3
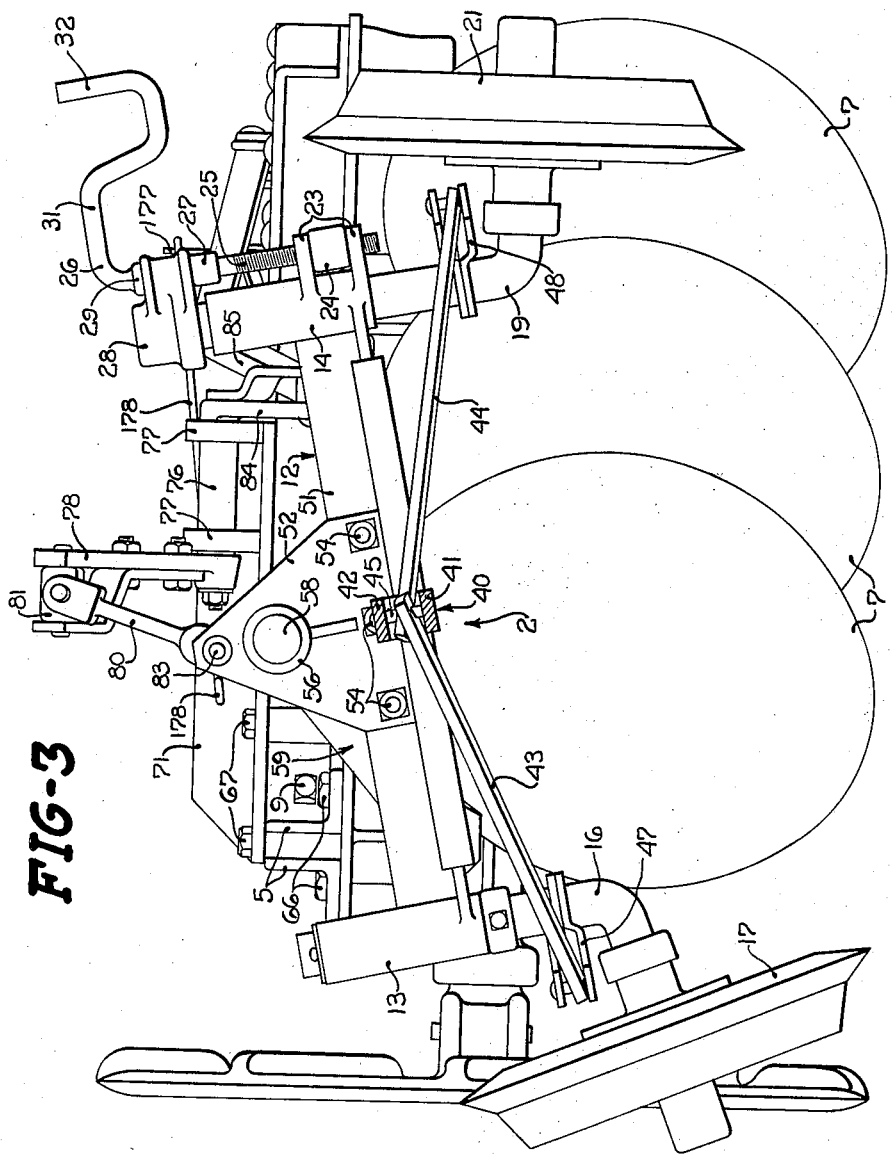
INVENTOR:
CARL G. STRANDLUND
BY
Brown, Jackson, Boettcher & Dienner
ATTORNEYS.

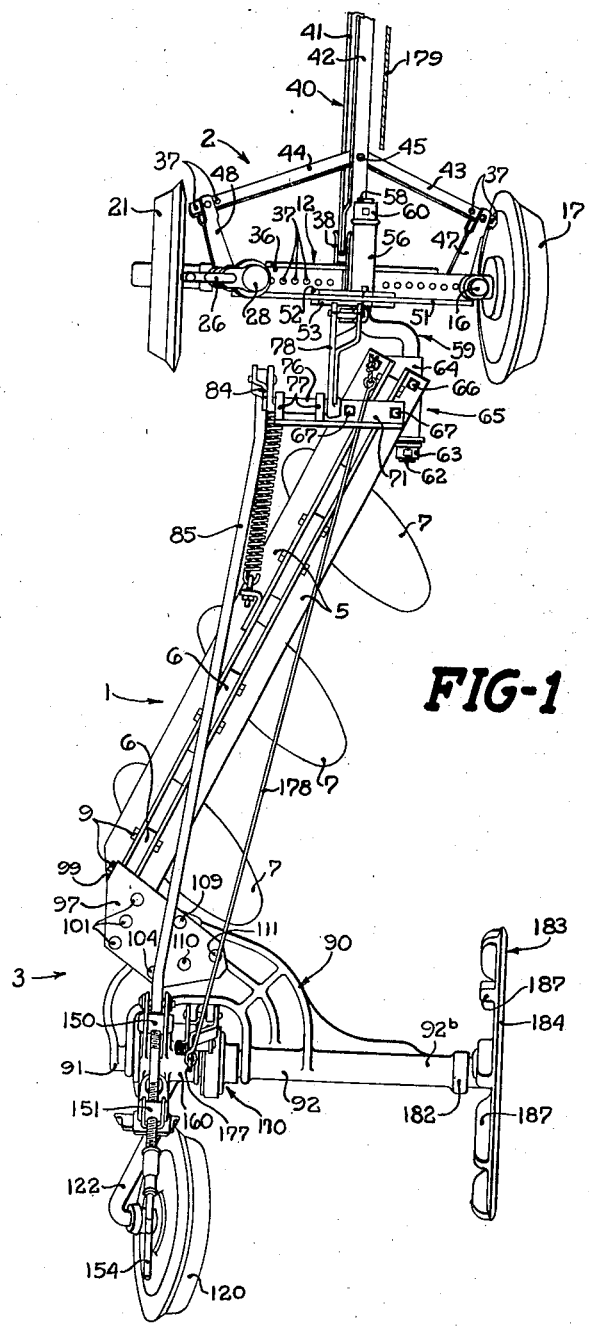

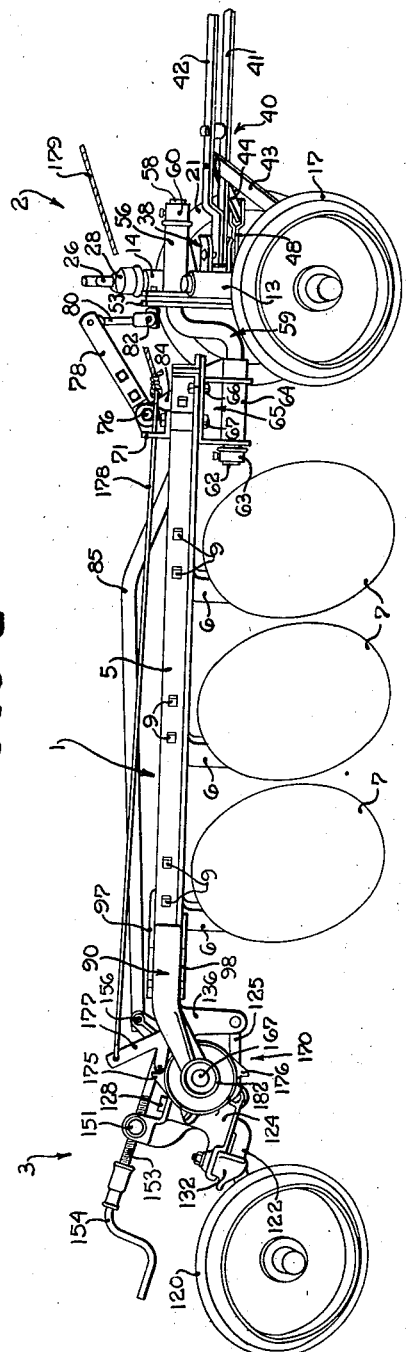

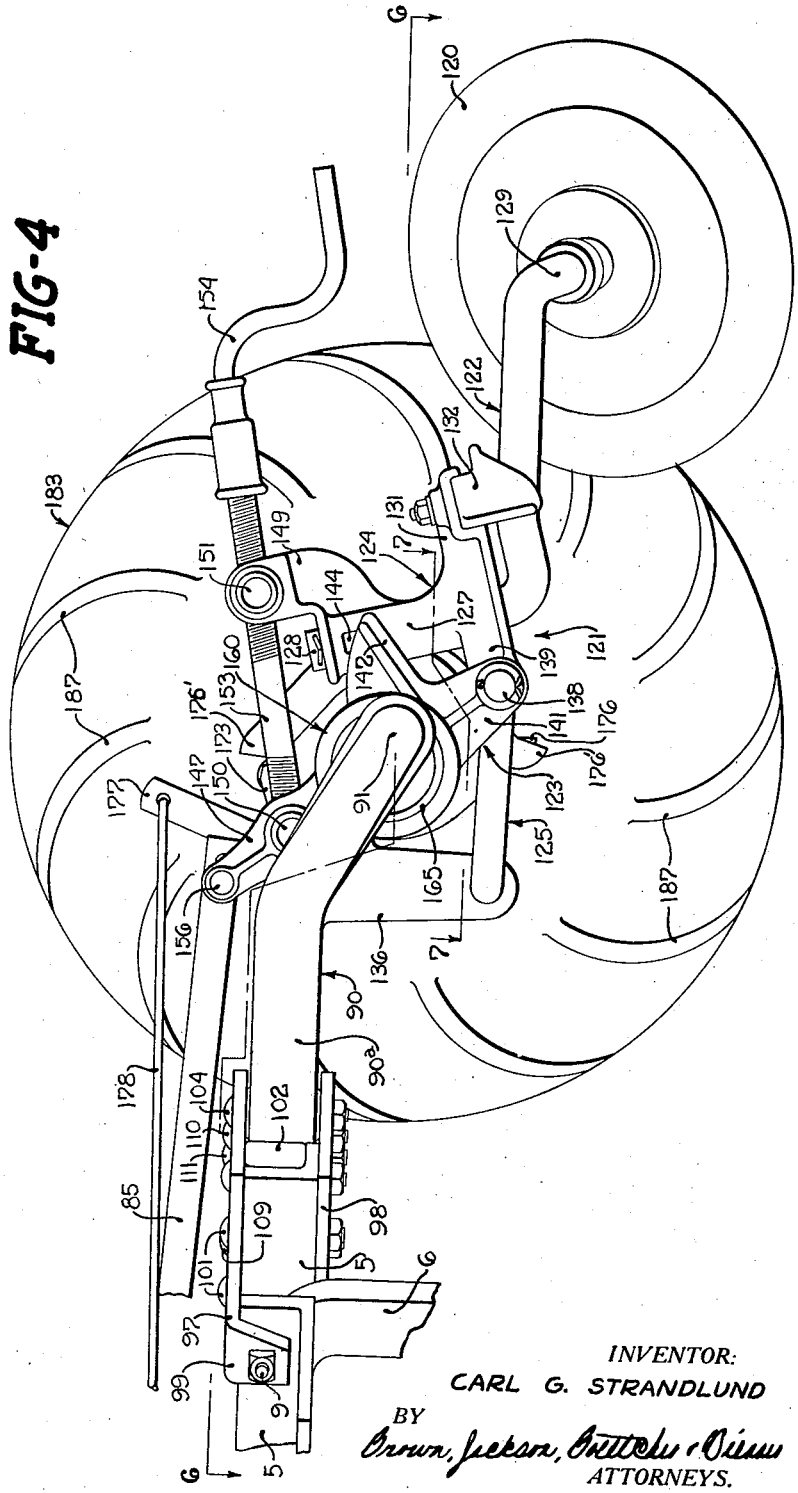

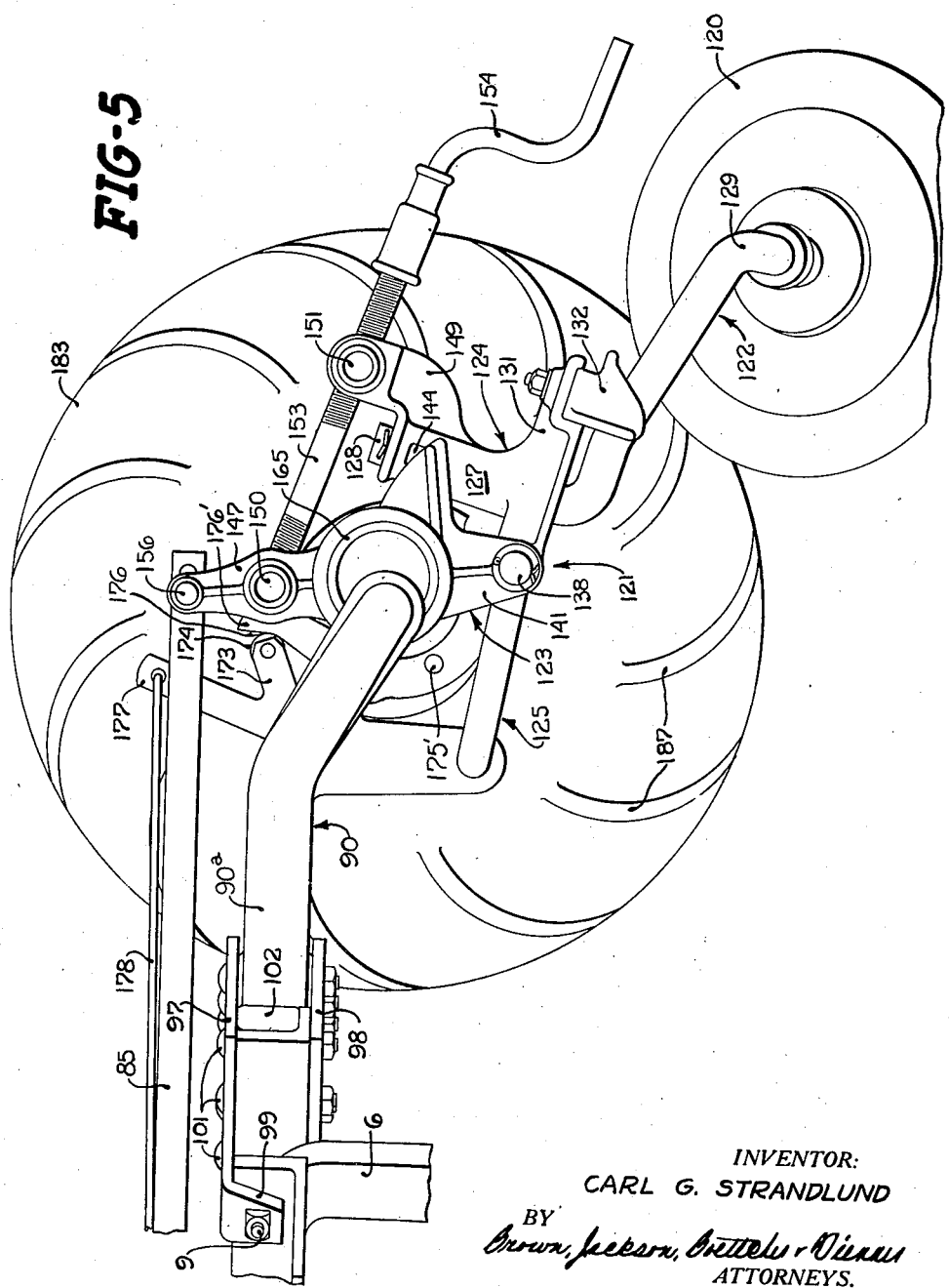

June 4, 1940.   C. G. STRANDLUND   2,202,931
DISK PLOW
Filed June 23, 1939   6 Sheets-Sheet 6
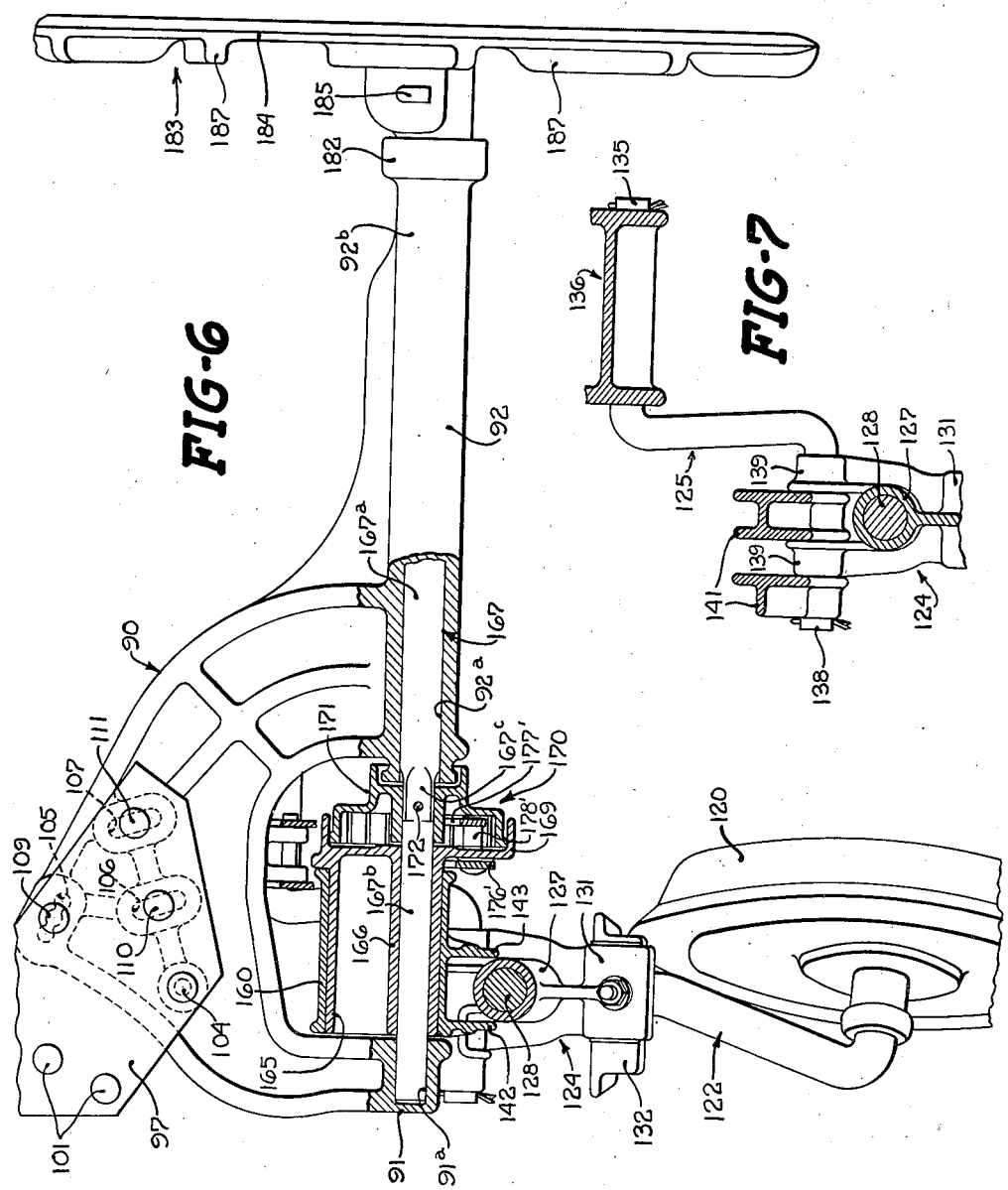
INVENTOR:
CARL G. STRANDLUND
BY
*Brown, Jackson, Boettcher & Dienner*
ATTORNEYS.

Patented June 4, 1940

2,202,931

UNITED STATES PATENT OFFICE 2,202,931

DISK PLOW

Carl G. Strandlund, Moline, Ill., assignor to Deere & Company, Moline, Ill., a corporation of Illinois Application June 23, 1939, Serial No. 280,710

22 Claims. (Cl. 97—72)

The present invention relates generally to agricultural implements and more particularly to plows and similar machines.

This invention is especially concerned with implements adapted for orchard or vineyard plowing in which it is necessary to construct the implement and arrange the parts thereof so that the plow can be worked close to trees or vines to work thoroughly the soil about the trees or vines notwithstanding low overhanging branches, which seriously interfere with ordinary soil-working tools.

The object and general nature of the present invention is the provision of a disk plow of the orchard type in which the land side of the plow is clear of obstructing parts and the like to permit the implement to operate as closely as possible to the trees or plants, and in this connection it is a further object of this invention to provide a rear supporting wheel for the implement disposed at the furrow side of the plow and arranged to cut through the turned soil down to the harder ground below. To this end, the rim of the wheel is made quite thin, so as to penetrate the freshly plowed and loose soil but which, nevertheless, finds sufficient bearing to support its portion of the weight of the implement on the harder ground at the furrow bottom.

Another feature of this invention is the provision of lugs or the like on the aforesaid wheel whereby it may be utilized to drive power lift mechanism notwithstanding the action of the wheel in cutting down through the plowed ground.

Still another important feature of the present invention resides in the provision of an improved power lift construction for raising and lowering the rear end of the plow. According to the present invention the rear frame casting of the plow consists of a generally U-shaped member receiving a shaft which is driven continuously by the ground wheel, the power lift clutch and associated parts being connected with said shaft intermediate its bearing support on the rear frame casting. More specifically, it is a feature of this invention to provide a barrel-like eccentric member mounted on the intermediate portion of the shaft and receiving a companion part which is connected to or forms a part of a swinging crank axle upon which the rear furrow wheel of the plow is journaled. The eccentric member is arranged to be actuated by a self-interrupting clutch mechanism of the half revolution type which is also connected to and supported by the intermediate portion of the shaft.

A still further feature of this invention is the provision of an improved front end support for a plow of this type, embodying a construction which is connected to the front end of the plow beam by a horizontally arranged crank, rocking movement of which adjusts the position of the front end of the plow beam relative to the front end support.

It is also a feature of this invention to provide an improved front end construction which embodies a transverse axle mounted for rocking movement on the front end crank and having two front wheels, one adapted to run on the land and the other adapted to run in the furrow opened on the previous round of the implement.

A further feature resides in the provision of raising and lowering means interconnected with the crank for rocking the same to raise and lower the front end of the implement, and preferably the crank at the front end is rocked at the same time the power lift mechanism at the rear end of the implement is actuated. The front end construction also embodies means for leveling the plow by adjusting the vertical position of the front land wheel relative to the transverse axle.

These and other objects and advantages of this invention will be apparent to those skilled in the art after a consideration of the following detailed description, taken in conjunction with the accompanying drawings illustrating the preferred embodiment.

In the drawings:

Figure 1 is a top or plan view of a disk plow embodying the present invention;

Figure 2 is a side view of the implement shown in Figure 1, the near rear wheel being removed to show the construction at the rear end of the plow;

Figure 3 is an enlarged view of the front end of the plow, looking rearwardly;

Figure 4 is a view of the rear end of the plow, taken at a scale approximately equal to the scale of Figure 3 and showing the left side of the plow, the parts being arranged in their plowing position;

Figure 5 is a view similar to Figure 4 showing the parts arranged in their transport position;

Figure 6 is a generally horizontal view, taken along the line 6—6 of Figure 4; and Figure 7 is a fragmentary sectional view taken along the line 7—7 of Figure 4.

Referring now more particularly to Figures 1 and 2, the plow disclosed is similar to the plow shown in the patent to William L. Paul, No. 1,915,379, issued June 27, 1933, and, similarly to the Paul plow, is particularly designed for orchard or vineyard plowing, with the parts arranged so that the plow can be worked close to the trees or vines, notwithstanding low overhanging branches. The implement is also, of course, adapted for general use and has the advantage that it may be operated close up against fences and other objects, when desired.

Generally, the plow as disclosed in the drawings consists of a plow beam 1, which serves as the frame of the implement, a front supporting structure 2, and a rear end support 3. The plow beam 1 consists of a pair of angle bars 5 disposed with their vertical flanges back-to-back and on opposite sides of a plurality of standards 6 which, at their lower ends, receive furrow opening disks 7. The disks 7 are rotatably mounted at the lower ends of the standards 6 in any suitable manner, and pairs of bolts 9 pass through suitable openings formed in the upper ends of the standards and the vertical flanges of the angles 5 for securely fixing the disk standards to the beam 1. The latter is arranged diagonally, as best shown in Figure 1, so that the forward disk turns the furrow slice into the furrow opened by the rearmost disk on the previous round, the second disk throws the furrow slice into the furrow opened by the front disk, and the rearmost disk throws its furrow slice into the furrow opened by the intermediate disk.

The front end supporting structure, indicated in its entirety by the reference numeral 2, consists of a transverse axle 12 having two spindle receiving sleeve sections 13 and 14 disposed generally vertically, as best shown in Figure 3. The sleeve 13 receives a spindle 16, the upper end of which is journaled for steering movement in the sleeve 13 while the lower end is angled downwardly and outwardly and receives a front furrow wheel 17. The other sleeve 14 receives a spindle 19 the upper end of which is journaled for steering movement in the sleeve 14 while the lower end is angled downwardly and outwardly and receives a land wheel 21. The spindle 19 can be adjusted vertically within the sleeve 14, and to this end the latter is provided with a pair of spaced ears 23 between which a nut 24 is held against rotation. The nut 24 receives the lower threaded end 25 of a crank member 26 which carries a collar 27 fixed thereto and bearing against the lower side of a cap 28 fastened in any suitable manner to the upper end of the spindle 19. The crank 26 carries any suitable means, such as an abutment 29, which bears against the upper side of the cap 28 and supports the weight of the front axle that is disposed thereon through the adjusting crank 26. The latter is arched, as at 31, to clear the cap 28 and has a handle extension 32 to facilitate rotating the crank to adjust the position of the sleeve 14 along the spindle 19.

The axle 12 is preferably formed with an integral flange 36 which is provided with a plurality of openings 37 to receive a bracket 38 in any one of a plurality of lateral positions. Pivoted to the bracket 38 is a draft or hitch tongue 40 which consists of two vertically spaced bars 41 and 42 by which draft is transmitted to the plow. Steering links 43 and 44 are pivoted to the draft tongue 40, as by a pin 45 (Figure 3), and extend laterally outwardly and are connected, respectively, to steering arms 47 and 48 which are fixed at their inner ends to the lower portions of the front wheel spindles 16 and 19. Thus, as the draft tongue 40 is turned laterally, the front wheels 17 and 21 are steered in the requisite direction.

The axle 12 includes a vertical flange 51 to the opposite sides of which a pair of triangular plates 52 and 53 are bolted, as at 54. These plates 52 and 53 form a bracket which supports a relatively long forward extending bearing sleeve 56, preferably but not necessarily formed integral with the forward bracket plate 52. The forwardly extending spindle section 58 of a crank member 59 is mounted for rocking movement in the bearing sleeve 56, and a cap 60 is secured to the forward end of the spindle section 58 so as to receive the forward draft from the axle 12 and transmit it to the crank 59. The latter is arranged generally horizontally and is provided with a rearwardly extending spindle section 62 which carries a cap 63 at its rear end and is received in a bearing sleeve 64 which preferably forms an integral part of a bearing casting 65. The latter is securely fixed to the forward ends of the plow beam angle bars 5 by any suitable means, such as bolts 66 and 67. The pair of bolts 67 are longer than the bolts 66 and extend upwardly beyond the vertical flanges of the angles 5 for the purpose of clamping a transverse angle member 71 to the forward end of the plow beam, as best shown in Figures 1 and 3.

Mounted on the transverse angle 71 is a rock shaft 76 supported in suitable spaced-apart lugs 77 welded or otherwise secured to the angle 71. The inner end of the rock shaft 76 is disposed generally in the vertical longitudinal plane of the forward spindle portion 58 of the swinging crank member 59, and an arm 78 is fixed at its rear end to the inner end of the rock shaft 76 and at its outer end is pivotally connected to a generally vertically disposed link 80 by means of a universal joint 81. The lower end of the link 80 is connected by a second universal joint 82 to a pivot pin 83 carried by the bracket plates 52 and 53 adjacent the sleeve 56 carried thereby. The pin 83 is disposed a short distance above the pivot axis defined by the spindle portion 58 of the crank member 59. The link 80 thus serves to transmit the weight of the front end of the plow beam 1 and associated parts to the axle 12 in such a manner that when the axle 12 is tilted, as shown in Figure 3, the wheel 17 running in the furrow sustains a greater load than the land wheel. This is an advantage in that the greater pressure on the furrow wheel holds the plow in its working position. When opening up the land, the axle 12 is horizontal and the link 80 substantially in line with the pivot axes 83 and 58; hence, the weight of the plow beam and associated parts is imposed equally on the two wheels 17 and 21.

Since the crank member 59 is free to rock in a generally vertical direction about the support of its spindle sections 58 and 62 in the sleeves 56 and 64, it will be seen that, by rocking the rock shaft 76 and the arm 78 fixed to the inner end thereof, the front end of the plow beam 5 may be raised and lowered, as desired.

The transverse shaft 76 is provided at its outer end with an arm 84 to which the forward end of an operating link 85 is pivotally connected. The link 85 is operated from the power lift mechanism at the rear of the plow, as will be described below, whereby whenever the rear end of the plow is raised into or lowered out of transport position, the front end of the plow beam will also be raised and lowered at the same time.

The rear end construction 3 is particularly designed to provide adequate support for the rear end of the plow beam but, at the same time, to accommodate the plow for working in close quarters. Briefly, the rear end construction 3 comprises a rear furrow wheel which runs in the furrow opened by the rearmost furrow opener and a laterally disposed ground wheel which extends far enough to one side to provide the desired support and stability for the plow and to run in a position substantially directly rearwardly of the front furrow wheel 17. To this end, the ground wheel is provided with a thin rim so as to cut down through the freshly plowed ground and run on the harder soil underneath or, in other words, upon the same furrow bottom traversed by the front furrow wheel 17.

Referring now more particularly to Figures 1 and 4 to 6, inclusive, the reference numeral 90 indicates a rear frame casting in the form of a generally U-shaped yoke having two rearwardly and downwardly extending sections 91 and 92, each bored to form a shaft-receiving sleeve, as indicated at 91a and 92a in Figure 6. The rear frame casting or yoke member 90 is adapted to be secured rigidly and firmly to the rear end of the plow beam angles 5 by means of upper and lower attaching plates 97 and 98. The upper plate 97 is formed with a tongue 99 that extends at right angles to the general plane of the plate 97 and receives the rear bolt 9 which clamps the standard 6 of the rearmost furrow opener to the rear end of the plow beam. The lower plate 98 engages the under side of the lower flange of the right hand plow beam angle bar 5, as best shown in Figures 4 and 5. Bolts 101 extend downwardly through the upper and lower plates 97 and 98, the right hand plow beam angle bar 5, and a filler bar 102 (Figures 4 and 5), whereby the plates 97 and 98 form a rigid rear extension of the plow beam structure 1. The forward portion 90a of the rear frame member 90 is disposed horizontally and lies between the plates 97 and 98. A pivot bolt 104 extends through suitable apertures in the plates 97 and 98 and the member 90, and the latter is provided with three slots 105, 106 and 107, as best shown in dotted lines in Figure 6, which receive, respectively, bolts 109, 110 and 111, carried by the attaching plates 97 and 98. The slot 105 is formed with three sets of bolt-receiving notches, whereby the member 90 may occupy any one of three angular positions relative to the plow beam 1. The other slots 106 and 107 do not have notches, but the associated bolts 110 and 111 serve to clamp the member 90 rigidly in place. The bearing casting 65 may likewise have slots receiving the bolts 66 and 67, and the front and rear members 65 and 90 can be adjusted to give the width of cut desired.

A rear wheel 120 is disposed to run in the furrow opened by the rearmost furrow opener and is connected to the rear frame member 90 by a crank axle structure indicated in its entirety by the reference numeral 121 and which includes an axle 122, a pair of pivotally interconnected castings 123 and 124, and a swinging link 125. The casting member 124 includes a sleeve section 127 which receives the upwardly turned spindle end 128 of the axle 122 the latter having a laterally and downwardly bent section 129 upon which the wheel 120 is journaled for rotation. The member 124 is provided with a rearwardly directed extension 131 which carries a laterally adjustable clamp 132 that engages a portion of the axle 122 rearwardly of the spindle 128 for the purpose of setting the furrow wheel 120 against the furrow wall to guide the rear end of the plow, as in conventional practice.

As best shown in Figure 7, the swinging link member 125 has a forward laterally extending spindle section 135 which is received in the lower end of a lug 136 that depends from and preferably is formed integral with the rear frame member 90, the lug being generally of I-beam cross-section, as indicated in Figure 7. The link member 125 also includes a rear spindle section 138 which extends through a pair of apertured ears 139 extending forwardly from the member 124. The casting 123 is also formed with a pair of apertured sections 141 (Figure 7) through which the spindle 138 passes, the latter therefore serving as means pivotally connecting the two members 124 and 125 together.

The casting 123 is provided with a pair of guide lugs 142 and 143 (Figure 6) which are disposed on opposite sides of the sleeve section 127 of the member 124, the sleeve section having pads 144 against which the lugs 142 and 143 bear, as best shown in Figure 4. The member 123 is formed with a pair of upstanding arms 147 and the member 124 is provided with an upstanding lug 149 which is bifurcated, the latter and the arms 147 being apertured to receive two screw-threaded trunnions 150 and 151. A screw shaft 153, having right and left-hand threads, is screwed into the trunnions 150 and 151 and at its rear end carries a hand crank 154. Thus, by turning the crank 154 in one direction or the other, the angular relation between the members 123 and 124 can be varied so as to vary the depth of plowing. The arms 147 are apertured to receive a pivot pin 156 which passes through one of two or more openings formed in the rear end of the link 85.

According to the principles of the present invention, suitable power lift mechanism is connected with the casting member 123 so that the rear end of the plow may be raised and lowered into and out of transport position by exerting a thrust against the rear furrow wheel 120 in a generally vertical direction, as by swinging the crank axle means 121.

Referring now more particularly to Figures 4, 5 and 6, the casting 123 is formed with a transversely extending sleeve section 160 which is disposed between the trunnion 150 and the pivot 138. The sleeve 160, as best shown in Figure 6, is of substantial transverse width and is generally cylindrical, as indicated in Figures 4 and 5. Disposed within the cylindrical sleeve section 160 is an eccentric barrel-like member 165 having an eccentrically disposed intermediate journal 166 mounted on a shaft 167 that is disposed for rotation in the bearing sleeves 91a and 92a (Figure 6). The shaft 167 has the major section 167a of larger diameter disposed in the bearing sleeve 92a, the section 167b being disposed in the bearing sleeve 91a and receiving the journal 166 of the eccentric member 165. Between the two shaft sections 167a and 167b is a squared section 167c formed by milling down the end portion of the section 167a of larger diameter, the section 167b of smaller diameter being then turned to provide a bearing portion of circular cross section receiving the eccentric member 165 and having bearing support in the sleeve section 91a, as described above.

One end of the eccentric member 165 carries or is formed integral with the driven member 169 of a power lift clutch indicated in its entirety by the reference numeral 170. The driving member of the power lift clutch 170 is indicated at 171 and is mounted on the squared section 167c of the shaft 167 and is also pinned thereto, as indicated at 172, so as to rotate with the shaft at all times. The power lift clutch mechanism 170 is of more or less conventional construction, embodying suitable means which may be operated optionally to engage the driving and driven parts 171, 169 so that the rotation of the shaft 167 will cause the eccentric member 165 to be rotated.

Power lift clutch mechanism of this type is controlled by an arm 173 which carries a roller 174 engageable with one of two lugs 175 and 176 carried by the driven member 169 so as to hold the latter and the eccentric in one position or the other, spaced generally 180° apart. Also, the operating mechanism of the power lift clutch includes an arm 176' pivotally mounted at 175' (Fig. 5) adjacent each of the lugs 175 and 176 and also engaged by the roller 174 so that the conventional clutch dog 177' is moved by a connecting pin 178' into its disengaged position whenever the roller 174 comes up against one of the lugs 175, 176, whereby the clutch is disconnected and the driven member 169 of the clutch and the eccentric associated therewith is held in position against further rotation. The arm 173 may be controlled in any suitable manner, as by having a second arm 177 to which a link 178 is connected and which extends forwardly to the front end of the plow (Figure 1), the front end of the link 178 being supported in a slot formed in the vertical flange of the angle 71, as shown in Figure 3. A rope or cable 179 may be connected to the front end of the link 178. A pull on the cable 179 acts through the link 178 to disengage the arm 173 from the associated lug 175 or 176, whereupon the rotation of the shaft 167, driven by a ground wheel as will be described below, is imparted to the eccentric 165, swinging the members 123 and 124, together with the associated furrow wheel 120, into and out of transport and plowing positions, as indicated in Figures 4 and 5. The swinging motion imparted thereby to the member 123 is communicated through the pivot 156 to the link 85, and from the latter to the front end construction, whereby both ends of the plow beam are raised and lowered at substantially the same time.

According to the principles of this invention, the rear frame member 90 is extended generally furrowward, as indicated at 92b in Figure 6, to form a long bearing for the right hand portion of the shaft 167. The latter extends outwardly of a dust collar 182 formed on the extension 92b and receives a ground wheel 183 of special construction. The rim 184 of the wheel is quite thin so that during operation it cuts through the turned soil down to the hard surface of the furrow bottom on which it bears. From Figure 1 it will be seen that the furrowward extension 92b of the rear frame member 90 extends a distance sufficient to bring the wheel 183 practically directly behind the front furrow wheel 17. Since the front furrow wheel 17 is spaced laterally from the front disk 7 so as to run in the furrow opened by the rear disk 7 on the preceding round, the wheel 183 cuts through the soil or furrow slice which is thrown by the front disk over into the furrow traversed by the front furrow wheel 17, the two wheels 17 and 183 therefore, in effect, running along the same furrow bottom. The soil in the furrow bottom, not being plowed by the disks 7, is relatively firm and therefore affords sufficient bearing for the wheel 183, notwithstanding that the rim is very thin, as compared with conventional wheels. Therefore, the operation of the plow is gauged by the three wheels 17, 120 and 183 running along the two furrow bottoms and the wheel 21 running on the unplowed land. Further, the wheel 183 does not tend to pack the ployed soil.

The wheel 183 is fixed to the end of the shaft 167 in any suitable manner, as by a clamping bolt 185, and the wheel 183 therefore serves to drive the power lift mechanism by which both ends of the plow beam 1 may be raised into and lowered out of transport position whenever the power lift clutch mechanism is actuated. In order to supply sufficient traction for this operation, the wheel 183 is provided with a plurality of generally radially extending lugs 187, preferably formed integrally with the wheel on the inner side thereof, and curved, as best shown in Figures 4 and 5, so as to enter the soil with minimum resistance to the forward rolling of the wheel.

In operation, as when opening up the land, the front crank screw 26 and the rear depth adjusting crank screw 154 are so adjusted that both front wheels 17 and 21 will run on the land. The rear furrow wheel 120 is adjusted to run in the furrow opened by the rearmost disk 7. After the first round has been completed, the front leveling adjusting crank 26 will be turned to accommodate the wheel 17 running in the furrow opened by the rearmost disk on the preceding round and the wheel 21 running on the land, as shown generally in Figure 3. On the second and subsequent rounds the wheel 183 will cut down through the soil turned by the front disk over into the furrow cut by the last disk on the preceding round, and will run on the same furrow bottom traversed by the front furrow wheel 17. The plow can be raised by exerting a pull on the cable 179 which, acting through the link 178, will trip the half revolution clutch, whereupon the forward rolling of the wheel 183 acts through the shaft 167 to turn the eccentric 165 from the position shown in Figure 4 to the position shown in Figure 5. The rotation of the eccentric about the axis of the driving shaft 167 exerts a generally downward and rearward thrust against the member 123 so that the lower end thereof will swing in the arc described by the swinging link member 125. The member 124, which carries the axle 122, is held by the adjusting crank screw 154 against movement relative to the member 123 and, therefore, when the member 123 is rocked downwardly and also rearwardly, as determined by the rotation of the eccentric 165 and the downward and forward swinging of the link 125, the rear end of the frame will be raised relative to the furrow wheel 120 from the position shown in Figure 4 to the position shown in Figure 5. At the same time, the arms 147 will exert a pull through the link 85 against the arm 84 on the rock shaft 76, rocking the latter in a clockwise direction as viewed in Figure 2, thus raising the front end of the plow relative to the front axle and swinging the crank member 59 in a counterclockwise direction as viewed in Figure 3. The plow can be lowered by tripping the clutch 170 a second time.

From the above description it will be seen that I have provided a novel plow, particularly adapted for orchard and/or vineyard plowing and in which the required lateral stability of the plow is secured by extending the ground wheel support in a furrowward direction to a point substantially directly behind the front furrow wheel, and forming the ground wheel with a thin rim that cuts down through the plowed soil and rests on the firmer soil underneath. The preferred construction is such that the ground wheel runs along the same furrow bottom traversed by the front furrow wheel, whereby maximum stability is secured but in which the lateral dimensions of the plow do not, in general, exceed by a very great extent the lateral width of the diagonally disposed beam which carries the furrow openers. This leaves the land side of the plow clear and unobstructed. The front end construction, with its two ground wheels and swinging crank for raising and lowering the front end of the beam relative thereto, provides a sturdy support for the front of the plow, and the rear end construction embodies a novel arrangement wherein the power lift clutch is mounted on the intermediate portion of the ground wheel driven shaft which is supported at both ends.

It will therefore be understood that while I have shown and described above the preferred form of my invention, the latter is not to be limited to the particular details shown and described, but that widely different means may be employed in the practice of the broader aspects of my invention.

What I claim, therefore, and desire to secure by Letters Patent, is:

1. A plow comprising means serving as a frame, front wheel means therefor, furrow opening means carried by said frame, a furrow wheel at the rear end of the frame, and a ground wheel connected in spaced relation with the frame so as to run over the soil turned by said furrow opening means and having a thin rim so as to penetrate the freshly turned soil down to the harder unturned soil underneath.

2. A plow comprising means serving as a frame, furrow opener means carried thereby, a front supporting wheel for the frame arranged to run in a furrow opened on the previous trip, and supporting means for the rear end of the frame including a transversely extending part and a supporting wheel journaled for rotation thereon and having a thin rim adapted to cut through the plowed earth and run on the bottom of said previously opened furrow.

3. A plow comprising means serving as a frame, front wheel means therefor, furrow opening means carried by said frame, a furrow wheel at the rear end of the frame, a ground wheel connected in spaced relation with the frame so as to run over the soil turned by said furrow opening means, power lift mechanism for raising said furrow opening means, and means driven by said ground wheel for actuating said mechanism.

4. An orchard disk plow comprising a generally diagonally disposed beam, a plurality of furrow opening disks carried thereby, a rear furrow wheel for supporting the rear end of the plow, an extension rigidly connected with said beam and extending furrowward, and a ground wheel journaled for rotation on said extension and having a thin rim adapted to cut through the plowed earth and run on the furrow bottom.

5. A plow comprising means serving as a frame, front furrow wheel means therefor, a plurality of diagonally arranged furrow openers carried by said frame, a rear furrow wheel supporting the rear end of the frame, said front and rear furrow wheels being swingable vertically relative to said frame means, the latter having a part extending laterally from the furrow side of the plow, a wheel having a thin rim mounted to rotate on said laterally extending part and having a thin rim so as to penetrate the soil turned by said furrow opening means, power lift means operatively connected with said furrow wheels for raising the frame means relative thereto, the rim of said third wheel having laterally extending lugs thereon, and means driven from said third wheel for actuating said power lift mechanism.

6. An agricultural implement comprising means serving as a frame, a ground engaging wheel mounted for generally vertical movement relative to said frame means, a transversely disposed shaft supported at its ends on said frame means, a ground engaging power lift wheel fixed to said shaft adjacent one end thereof, an eccentric disposed about said shaft intermediate its ends and connected with said vertically shiftable wheel for raising or lowering the frame means relative thereto, and clutch actuated means driven from said shaft for operating said eccentric member.

7. An agricultural machine as defined in claim 6, further characterized by said frame means having a yoke provided with a pair of spaced apart bearing sections receiving said shaft, the eccentric member and said clutch actuated means being disposed about the portion of said shaft between the bearing sections of said yoke.

8. In an agricultural implement, power lift mechanism comprising a constantly rotatable shaft, bearing means for opposite ends of said shaft, a driving clutch member fixed to said shaft intermediate the ends thereof, a driven member rotatable on the intermediate portion of said shaft and accommodating relative rotation therebetween, an eccentric fixed to said driven clutch part, and means receiving motion from the rotation of said eccentric when said clutch parts are engaged for raising and lowering the implement.

9. A plow comprising a frame, a frame casting secured to the rear end of said frame and including two laterally spaced apart bearing sections, a shaft journaled for rotation in said bearing sections, a crank axle pivoted at its forward end to said frame casting and including a sleeve section through which said shaft extends, an eccentric member disposed within said sleeve section and carried by said shaft between said bearing sections, a rear furrow wheel fixed to the rear end of said crank axle, a power lift wheel fixed to one end of said shaft, and clutch means also disposed between said bearing section and optionally connecting said eccentric member to said shaft for rotating said eccentric within said sleeve and acting through the latter to swing said crank axle.

10. A plow as defined in claim 9, further characterized by generally vertically adjustable front wheel means connected to the front end of said frame, and means controlled by the rotation of said shaft for adjusting the front end of said frame relative to said front supporting wheel means.

11. A disk plow comprising a generally diagonally disposed beam, a plurality of disks carried thereby, a rear frame casting including a generally U-shaped yoke member having the intermediate portion secured to the rear end of said beam and the ends of the yoke section formed as shaft receiving sleeves, a shaft disposed in said sleeves, a ground engaging wheel fixed to said shaft, a rear furrow wheel, crank axle means on which said rear furrow wheel is journaled, a swingable link pivoted at one end to said rear frame casting and at the other end to said crank axle means, the latter being formed with a cylindrical sleeve section, an eccentric mounted on said shaft between said shaft receiving sleeves and disposed within said sleeve section of the crank axle means, and a power lift clutch of the half revolution type driven from said shaft and arranged to drive said eccentric for swinging said crank axle means and said link relative to the rear end of the frame for raising and lowering the latter.

12. A rear end construction for plows and the like having means serving as a frame, comprising a rear frame member having two spaced-apart shaft receiving sleeves, a shaft carried thereby, a ground wheel fixed to one end of said shaft, a second ground wheel, swinging crank axle means connected with said frame member and receiving said second ground wheel, clutch means disposed between said shaft receiving sleeves and driven from said shaft, and means driven by said clutch means and acting against said swinging crank axle means for raising and lowering the rear end of said frame means.

13. A rear end construction as defined in claim 12, further characterized by said crank axle means including two pivotally interconnected parts, each carrying a screw-threaded trunnion, a screw-threaded crank shaft connected with said trunnions for adjusting the relative position of one crank axle part with respect to the other, the means driven by said clutch means comprising an eccentric mounted on said shaft between said shaft receiving sleeves, a transversely extending cylindrical section carried by one of said parts and receiving said eccentric, an arm receiving the trunnion for said one crank axle part extending outwardly from said cylindrical section, and a connection with said arm for operating other parts of the implement.

14. Power lift mechanism for agricultural implements and the like comprising a generally U-shaped member having two spaced apart shaft receiving sections, a shaft journaled for rotation in said sections, said shaft having a squared portion intermediate said shaft-receiving sleeves, means for driving said shaft continuously during operation of the implement, an eccentric mounted on said shaft intermediate said shaft receiving sections of the yoke member, and a power lift clutch comprising a driving member fixed to the squared portion of said shaft to rotate therewith at all times, and a driven section connected with said eccentric.

15. A plow comprising a plow beam, a sleeve fixed to the forward end thereof and extending generally longitudinally of the plow, a crank having a first spindle section mounted for rocking movement in said sleeve, said crank having a second spindle section disposed generally laterally of the first spindle section, front wheel supporting means for the plow having a sleeve receiving said second spindle section of the crank, and means carried by the plow for rocking said crank to raise and lower the front end of the plow beam.

16. A plow comprising a plow beam, a crank having laterally offset spindle sections, means on the plow beam rockably receiving one of said spindle sections, front wheel supporting means rockably receiving the other spindle section, and means including an arm rockably mounted at the front end of said beam generally in the vertical plane of said second spindle section and connected therewith for raising and lowering the front end of the plow beam relative to said front wheel supporting means.

17. A plow comprising a plow beam extending generally diagonally, a generally horizontally disposed crank having laterally spaced apart longitudinally extending spindle sections, means adjacent the forward end of the plow beam for receiving one of said spindle sections, a front wheel support including an axle and two laterally spaced front wheels journaled on the ends of said axle, means on said axle for receiving the other spindle of said crank, a plurality of furrow openers carried by said beam, one of said front wheels constituting a front furrow wheel and spaced relative to said furrow openers so as to run in the furrow opened by the rearmost furrow opener on the previous round, supporting means for the rear end of the plow beam comprising a rear furrow wheel arranged to run in the furrow opened by the rearmost furrow opener and a second laterally spaced wheel disposed generally directly rearwardly of said front furrow wheel and arranged to cut through the plowed earth and run on the level bottom of the furrow in which said front furrow wheel runs, and means deriving power from said last mentioned wheel for rocking said crank and said rear furrow wheel so as to raise and lower the plow beam.

18. An orchard disk plow particularly adapted for orchard and vineyard plowing, comprising a diagonally arranged beam, a plurality of furrow opening disks carried thereby, supporting means for the front end of said beam comprising a transverse axle connected to the front end of the beam and a front furrow wheel and a front land wheel journaled on opposite ends of said axle, and supporting means for the rear end of the plow comprising a rear furrow wheel arranged to run in the furrow opened by the rearmost disk, the front furrow wheel being adapted to run in the furrow opened by the rearmost disk on the previous round, and a supporting wheel spaced from the rear furrow wheel in a furrowward direction and adapted to cut through the plowed earth thrown by the front disk into the furrow traversed by the front furrow wheel.

19. A front end construction for a plow having a plow beam, comprising an axle and a pair of laterally spaced front wheels, and means connecting the front end of said beam to said axle, comprising a horizontally disposed crank member having longitudinally extending laterally spaced spindle portions, one journaled on said frame and the other on said axle, said axle being thereby capable of pivoting relative to said plow beam in a transverse vertical plane, said front wheels being so disposed that one runs in the furrow opened on the previous round and the other runs on the unplowed land, and means carried by said axle for adjusting the position of said land wheel relative thereto for leveling the plow.

20. A plow comprising a generally diagonally disposed beam, a plurality of furrow openers carried thereby, a longitudinally extending sleeve fixed to the forward end of said plow beam, a generally horizontally arranged crank having a rearwardly extending spindle section disposed in said sleeve and a forwardly extending spindle section disposed generally laterally of said rearwardly extending spindle, means on the latter for transmitting forward draft to said sleeve and beam, a front wheel support for said beam comprising an axle having a sleeve receiving said laterally spaced spindle and providing for rocking movement of said axle relative to said beam, means at the forward end of said last mentioned spindle for receiving draft from said axle and transmitting it to said crank, hitch means connected to said axle, a laterally extending bar fixed to the forward end of said plow beam, a rock shaft mounted for pivotal movement on said bar and including an arm operatively connected with said axle, rocking movement of said rock shaft reacting through said arm for rocking said crank and raising and lowering the forward end of said plow beam, a rear frame casting connected to the rear end of said plow beam and including a yoke having two laterally spaced axle receiving sleeves, a rear furrow wheel, a swinging crank axle pivotally connected with said yoke and receiving said rear furrow wheel, a shaft disposed in said shaft receiving sections, an eccentric mounted on the intermediate portion of said shaft between said sections, a rocking member receiving said eccentric and connected at one end with said crank axle, a second arm connected with said forward rock shaft, a longitudinally extending link extending from said second arm to the other end of said eccentric receiving member, a ground wheel fixed to said shaft, and a half revolution clutch carried at the intermediate portion of said shaft and including a driving member fixed thereto and a driven member connected to said eccentric, whereby when said clutch is actuated said eccentric is rotated and the eccentric receiving member acts against the rear crank axle and said forward crank for raising and lowering both ends of said plow beam relative to the ground.

21. A plow comprising a generally diagonally disposed beam, a plurality of furrow openers carried thereby, a longitudinally extending sleeve fixed to the forward end of said plow beam, a generally horizontally arranged crank having a rearwardly extending spindle section disposed in said sleeve and a forwardly extending spindle section disposed generally laterally of said rearwardly extending spindle, means on the latter for transmitting forward draft to said sleeve and beam, a front wheel support for said beam comprising an axle having a sleeve receiving said laterally spaced spindle and providing for rocking movement of said axle relative to said beam, means at the forward end of said last mentioned spindle for receiving draft from said axle and transmitting it to said crank, means for rocking said crank to raise and lower the front end of said beam, and hitch means connected with said axle.

22. A plow comprising a generally diagonally disposed beam, a plurality of furrow openers carried thereby, a longitudinally extending sleeve fixed to the forward end of said plow beam, a generally horizontally arranged crank having a rearwardly extending spindle section disposed in said sleeve and a forwardly extending spindle section disposed generally laterally of said rearwardly extending spindle, means on the latter for transmitting forward draft to said sleeve and beam, a front wheel support for said beam comprising an axle having a sleeve receiving said laterally spaced spindle and providing for rocking movement of said axle relative to said beam, means at the forward end of said last mentioned spindle for receiving draft from said axle and transmitting it to said crank, hitch means connected to said axle, a laterally extending bar fixed to the forward end of said plow beam, a rock shaft mounted for pivotal movement on said bar and including an arm operatively connected with said axle, rocking movement of said rock shaft reacting through said arm for rocking said crank and raising and lowering the forward end of said plow beam, vertically adjustable means for supporting the rear end of said plow beam, and means operatively connecting said rear vertically adjustable means with said rock shaft.

CARL G. STRANDLUND.